B. E. CHANEY.
VACUUM COTTON PICKING MACHINE.
APPLICATION FILED JULY 5, 1917.

1,256,438.

Patented Feb. 12, 1918.
3 SHEETS—SHEET 1.

Witness
Edwin J Beller.

Inventor
Bailey E. Chaney.
by Wilkinson & Gusta
Attorneys

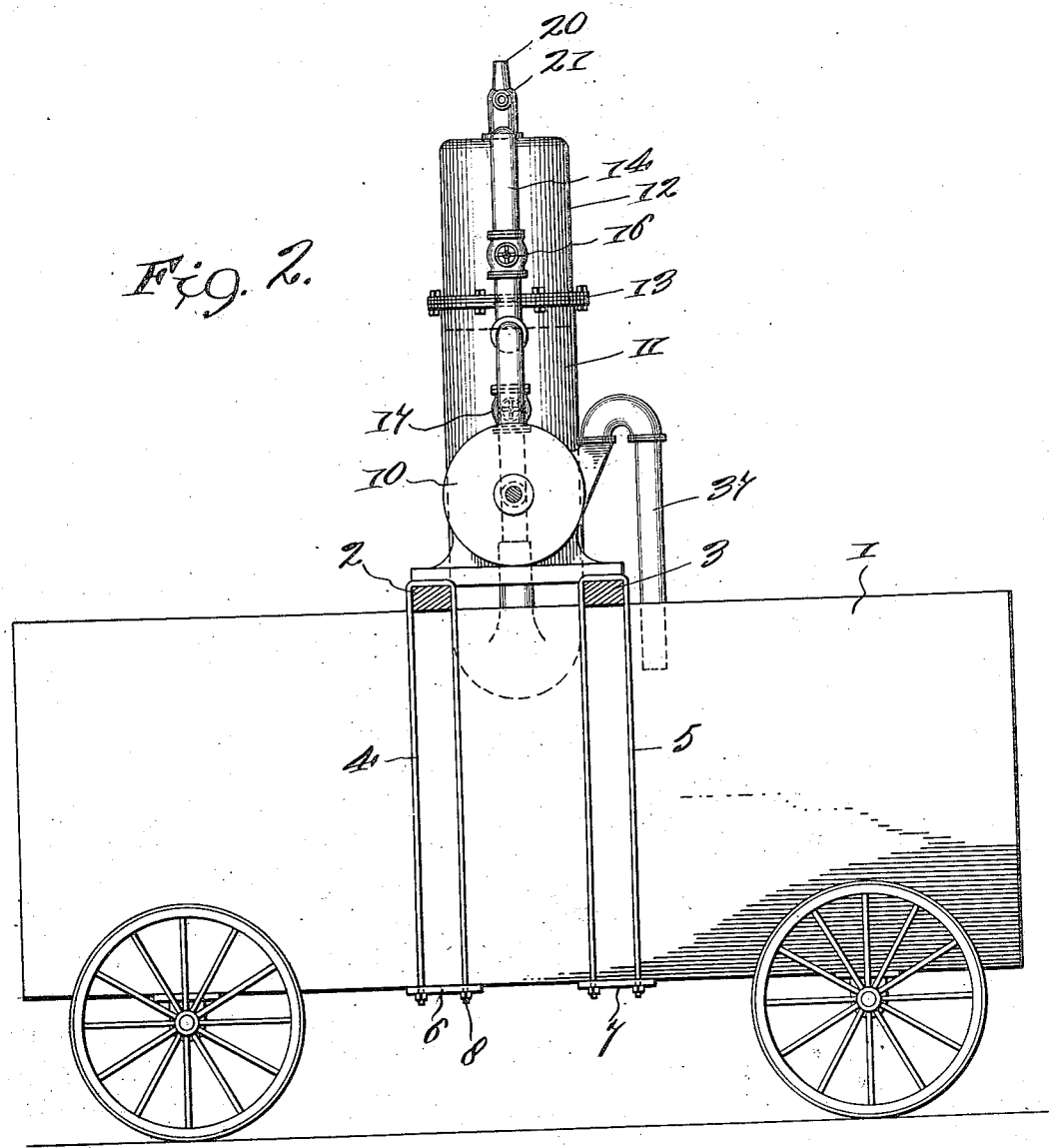

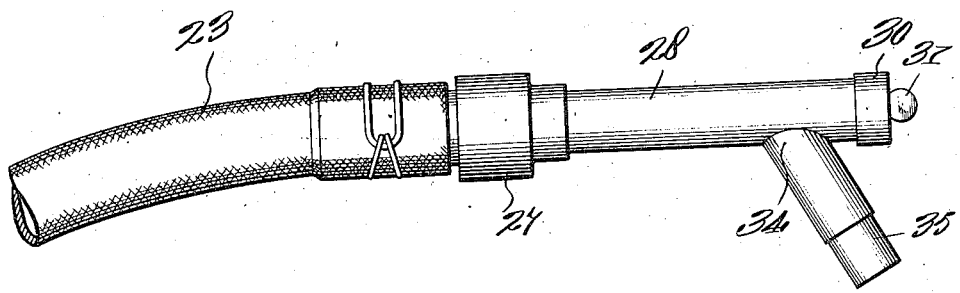
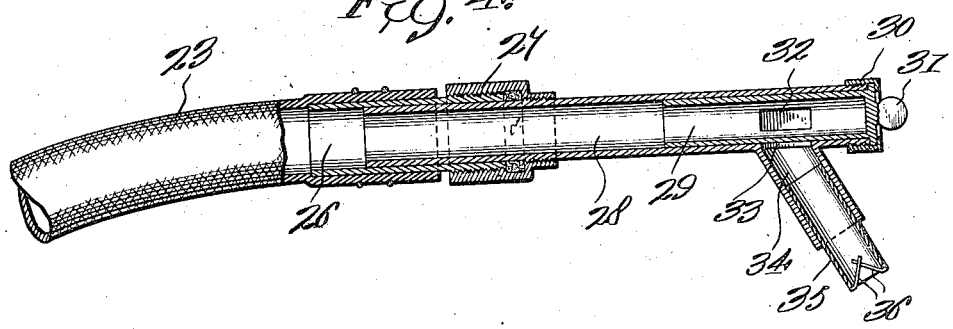
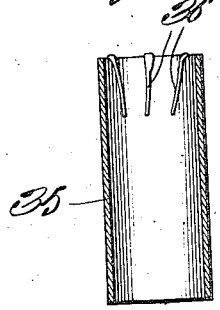
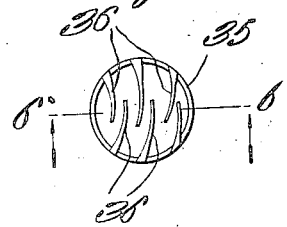

UNITED STATES PATENT OFFICE.

BAILEY E. CHANEY, OF CORPUS CHRISTI, TEXAS.

VACUUM COTTON-PICKING MACHINE.

1,256,438.   Specification of Letters Patent.   Patented Feb. 12, 1918.

Application filed July 5, 1917. Serial No. 178,849.

*To all whom it may concern:*

Be it known that I, BAILEY E. CHANEY, a citizen of the United States, residing at Corpus Christi, in the county of Nueces and State of Texas, have invented certain new and useful Improvements in Vacuum Cotton-Picking Machines; and I do hereby declare the following to be a full, clear, and exact description of the invention, such as will enable others skilled in the art to which it appertains to make and use the same.

The present invention relates to improvements in vacuum cotton picking machines, and has for one object to provide a machine of this kind which is assembled on a portable platform capable of being placed on and attached to any form of wagon.

Another object of the invention lies in providing a cotton picking machine including a receiver for the cotton and means to discharge the cotton from said receiver from time to time.

It is a further object of the present improvement to furnish an improved cotton picking nozzle with guard fingers to exclude foreign matter, and with a valve to control the suction therethrough.

In the accompanying drawings forming a part of this application, and in which similar reference symbols indicate corresponding parts in the several views:

Fig. 2 is a sectional view on the line 2—2 in Fig. 1.

Fig. 3 is a fragmentary elevational view of one of the picking devices.

Fig. 4 is a longitudinal view therethrough.

Fig. 5 is a plan view of one of the nozzles; and

Fig. 6 is a cross section on the line 6—6 in Fig. 5.

Figure 1:
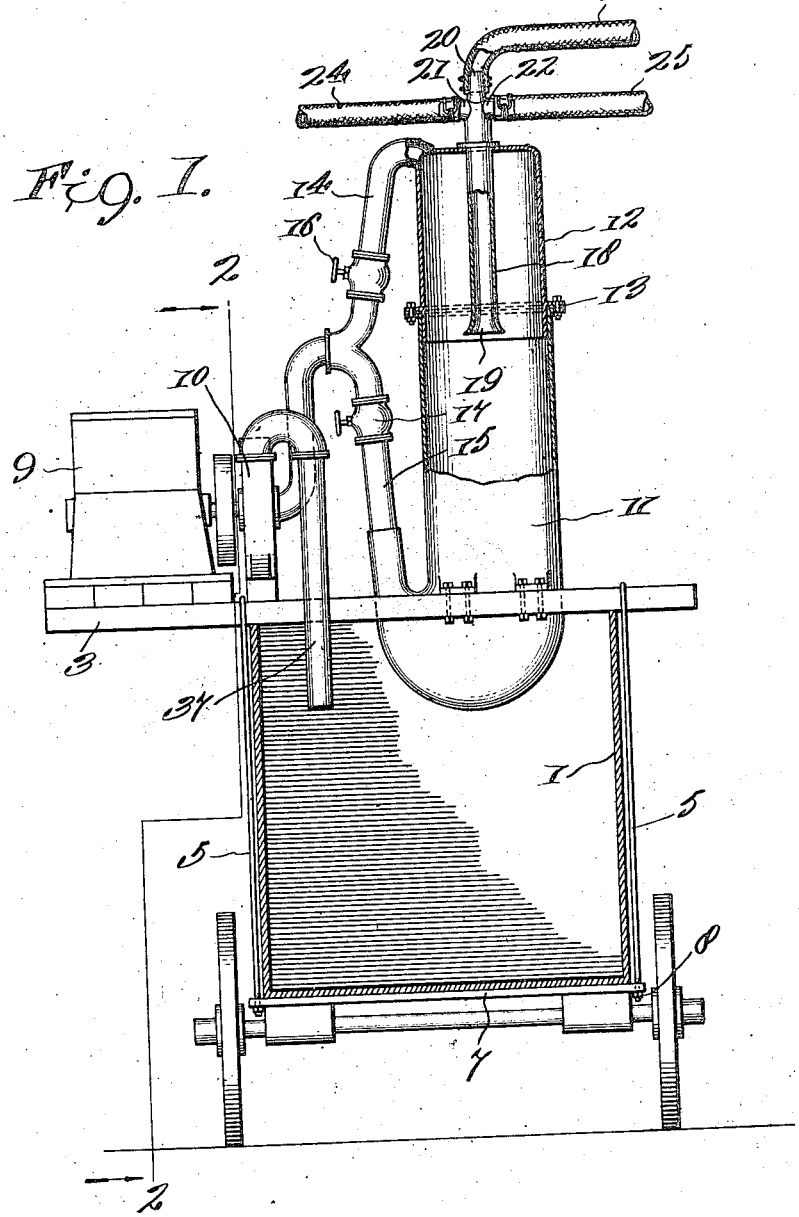
Figure 1 is a cross sectional view through a wagon showing in elevation an improved cotton picking machine thereon constructed in accordance with my invention and with parts shown in section.

Referring in detail to the drawings, I designates a wagon, which may, of course, be any other vehicle or carrier, and which may be drawn along by draft animals or self-propelled. The picking machine is a unit, it being assembled on a portable platform, the two main sills of which are indicated at 2 and 3 and rest upon the wagon box with their ends projecting over the wagon sides. A secure means of attaching the platform to the wagon 1 may be found in the U-bolts 4 and 5, which engage at each side with the sills 2 and 3 and have their lower threaded ends passed through the projecting pieces 6 and 7, where they receive nuts 8. Obviously other means may be employed to removably hold the platform on the wagon.

On the platform, at one end, is installed the engine or motor 9 for driving the fan or other suction-producing device 10. A receiver 11 having a top 12 closed by a telescoping and flanged packed joint 13, connects with the intake of the fan 10 through two separate pipes 14 and 15 at top and bottom, respectively; and each pipe 14 and 15 is under the control of a valve 16 and 17.

A pipe 18 projects down through the center of the top 12 of the receiver and terminates in a wide mouth 19 a considerable distance below the end of the pipe 14. This pipe 18 also extends above the top 12 where it is formed with the nipples 20, 21 and 22 furnishing means for the attachment of picking tubes 23, 24 and 25.

Each of the picking tubes carries a nozzle, as shown in Figs. 3 to 6, where the end of the tube 23 is illustrated as slipped over a nipple 26 having a threaded outer end engaged by the coupling nut 27. Within the nipple 26 is received a short length of pipe 28, likewise engaged by the coupling nut 27. A cylindrical valve 29 rotates in the outer end of the pipe 28, is held in place by a nut 30, and receives its movement through a knob 31.

A port 32, in the valve 29, is adapted to register with a similar port 33 in the pipe 28, over which is secured a branch 34 carrying the nozzle 35. In the nozzle 35 are bent spring guard fingers or wires 36, which preferably extend between one another in the manner shown to advantage in Fig. 5.

The machine being mounted on a suitable vehicle or carrier, as disclosed in Figs. 1 and 2, is made to operate as the vehicle proceeds in the following manner:

The pickers walk before the machine holding the ends of the picking tubes 23, 24 and 25, which may be suspended above the horses' heads, where animals are used to pull the vehicle, on a beam fastened to the wagon 1. The attendant on the wagon will close the valve 17 and open the valve 16, while the pickers turn the valves 29 by the knobs 31 to open the ports 32, 33, to that extent necessary for the best results.

The engine or motor 9 having been set in motion to drive the fan or suction device 10, the pickers apply the nozzles 35 to the plants so as to bring the latter under the influence of the suction created by the device 10. This suction will draw in the cotton between the spring fingers 36 and into the nozzle 35; after which it will pass through the ports 33 and 32 and be conveyed by the picking tubes through the pipe 18 and into the receiver 11, where it will deposit in the bottom thereof, air by which it is drawn in passing up through the top 12 of the receiver and out through the pipe 14 through the open valve 16 and to the intake of the suction device 10. The fingers 36 will prevent the entrance of any foreign matter to the nozzle and picking tubes, and a complete regulation of the amount of suction may be had through rotating the cylindrical valves 29 by the knobs 31.

This action is continued for some time, until the receiver 11 is filled to the desired amount with the accumulated cotton, whereupon the valve 16 is closed and the valve 17 opened, thus placing the bottom of the receiver 11 in communication with the intake of the fan 10 through the pipe 15. When this has been done the cotton will be placed under the influence of the suction created by the fan 10, and will be drawn through the pipe 15 to such fan 10 and exhausted thereby through the pipe 37 into the wagon 1, or to a bag provided to receive the same.

After having exhausted all of the cotton from the receiver 11, the valve 17 is again closed and the valve 16 reopened to permit the normal operation of the device and the deposit of the cotton in the bottom of said receiver.

It is one advantage of such a device that the machine may be carried by a vehicle having no capacity to carry cotton; and the cotton may be periodically discharged from the receiver 11 into a bag or other receptacle at predetermined points, or at such intervals at which the receiver 11 becomes filled, and the bags may be thrown to the ground and picked up by other wagons. In such case the vehicle carrying the cotton machine may proceed without the burden of carrying the accumulated cotton in the wagon box 1.

It is obvious that those skilled in the art may vary the details of construction and arrangements of parts without departing from the spirit of my invention, and therefore I do not wish to be limited to such features except as may be required by the claims.

The receiver 11 may be removed, if desired, by disconnecting its upper flange from the bolts by which it is connected to the lower flange of the top 12; and a sack attached to this lower flange of the top 12, in any desired manner, so as to receive the cotton from the pipe 18 in place of the receiver 11. The valve 17 in this case will, of course, be always closed. When using the apparatus in this way the sack is preferably of waterproof material, and is held distended to prevent its collapse by a suitable frame on the inside of such sack.

I claim:

1. A cotton picking machine including a receiver, a suction-producing device connected to the upper and lower parts of said receiver, and valves for controlling the communication between the suction device and the upper and lower parts of said receiver, substantially as described.

2. A cotton picking machine including a receiver, a suction device, pipes connecting said device with the upper and lower parts of said receiver, a normally-open valve in the upper pipe, and a normally-closed valve in the lower pipe adapted to be opened when the receiver is to be relieved of the accumulated cotton, substantially as described.

3. A cotton picking machine including a receiver, a suction device in connection with the upper and lower parts of said receiver, a pipe in the upper part of said receiver extending down therein and having its open end considerably below the point of the upper suction connection, and means for permitting the removal of the cotton through the lower connection, substantially as described.

4. A picking tube, a pipe fitted therein and having a port, a nozzle in communication with said port, and a valve in said pipe for controlling the port area, substantially as described.

5. A nozzle for cotton pickers having bent spring guard fingers extending between one another for preventing the entrance of foreign matter, substantially as described.

In testimony whereof, I affix my signature.

BAILEY E. CHANEY.